United States Patent
Dodd

(10) Patent No.: US 8,523,207 B2
(45) Date of Patent: Sep. 3, 2013

(54) DEVICE FOR ATTACHING A SUSPENSION TO A VEHICLE FRAME AND RELATED METHOD

(75) Inventor: Cully B. Dodd, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 66 days.

(21) Appl. No.: 13/230,438

(22) Filed: Sep. 12, 2011

(65) Prior Publication Data

US 2013/0062852 A1    Mar. 14, 2013

(51) Int. Cl.
*B60G 3/12*    (2006.01)
*B62D 61/12*   (2006.01)

(52) U.S. Cl.
USPC .......... 280/124.116; 180/209; 280/86.5; 280/124.153

(58) Field of Classification Search
USPC .......... 29/525.01, 525.02, 525.11; 180/209; 280/81.1, 86.5, 124.11, 124.116, 124.153; 411/265, 270, 426, 350, 353, 354, 367, 368, 411/536, 546, 553, 555, 915
See application file for complete search history.

(56) References Cited

U.S. PATENT DOCUMENTS

| | | | | |
|---|---|---|---|---|
| 1,751,871 A | * | 3/1930 | McCulla | 280/81.1 |
| 2,913,252 A | * | 11/1959 | Norrie | 280/6.159 |
| 5,230,528 A | * | 7/1993 | Van Raden et al. | 280/86.5 |
| 5,458,360 A | * | 10/1995 | Raidel, Sr. | 280/686 |
| 5,683,098 A | * | 11/1997 | VanDenberg | 280/124.116 |
| 6,182,984 B1 | * | 2/2001 | Chalin | 280/86.751 |
| 6,508,393 B2 | * | 1/2003 | Chalin | 228/136 |
| 6,796,566 B2 | * | 9/2004 | VanDenberg | 280/86.5 |
| 6,871,862 B2 | * | 3/2005 | Chalin | 280/86.5 |
| 7,270,341 B2 | * | 9/2007 | Longworth et al. | 280/124.11 |
| 8,302,988 B2 | * | 11/2012 | Noble | 280/681 |
| 2012/0248725 A1 | * | 10/2012 | Chalin | 280/124.11 |
| 2013/0001913 A1 | * | 1/2013 | Aalderink | 280/124.153 |

OTHER PUBLICATIONS

Watson & Chalin; 20,000# Capacity Non-Steer, Drawing # AL-2200, dated Jul. 17, 2009, 1 page.
Link Liftable Suspensions; "Intsullation Instructions Parts List: Duralift II", dated Jun. 20, 2006, 12 pages.

* cited by examiner

*Primary Examiner* — Faye M Fleming
*Assistant Examiner* — Laura Freedman
(74) *Attorney, Agent, or Firm* — Smith IP Services, P.C.

(57) ABSTRACT

A method for securing a suspension may include attaching a frame interface device to a vehicle frame and aligning a first connector set. Two first connectors may straddle a second connector, or a first connector may be straddled by two second connectors, when the connector set is aligned. These aligned connectors may be secured by a fastener, thereby securing the suspension to the frame. A suspension attachment system may include a hanger bracket of a suspension, a frame interface device, and a connector set. Two first connectors may straddle a second connector when the connector set is aligned. The suspension may be secured to the frame as a result of the aligned and secured connector set.

25 Claims, 15 Drawing Sheets

DEVICE FOR ATTACHING A SUSPENSION TO A VEHICLE FRAME AND RELATED METHOD

BACKGROUND

This disclosure relates generally to a vehicle suspension and, in an example described below, more particularly provides an interface device for attaching a suspension to a vehicle frame.

A suspension may be delivered to a vehicle manufacturer for attachment to a vehicle frame. Since most suspensions are large and heavy, it is not a trivial matter to maneuver the suspension into alignment with the frame and then hold the suspension in place to secure the suspension to the frame. Therefore, it can be seen that improvements in the art are needed.

SUMMARY

In the disclosure below, an interface device and a related method for attaching a suspension to a vehicle are provided which solve at least one problem in the art. One example is described below in which a suspension attachment system may include multiple configurations of the interface device for securing a suspension to a vehicle frame. Another example is described below in which a suspension attachment system may include a suspension connected to a vehicle frame as a result of a connection of a hanger bracket to an interface device.

In one aspect, a method for securing a suspension is provided that may include attaching a frame interface device to a vehicle frame and aligning a first connector set. The first connector set may include two first connectors of a hanger bracket that may straddle a second connector of the device when the first connector set is aligned. These aligned connectors may be secured together by a fastener thereby securing the suspension to the frame.

In another aspect, a method for securing a suspension is provided that may include attaching a frame interface device to a vehicle frame and aligning a first connector set. The first connector set may include a first connector of a hanger bracket that may be straddled by two second connectors of the device when the first connector set is aligned. The first and second connectors may each include a generally tubular portion. When the first connector set is aligned, one of the second connectors may be proximate each end of the first connector tubular portion. The aligned connectors may then be secured together with a fastener, thereby securing the suspension to the frame.

In yet another aspect, a method for securing a suspension is provided that may include attaching a frame interface device to a vehicle frame and aligning a first connector set. The first connector set may include two first connectors of a hanger bracket and one second connector of the device. The two first connectors are inserted into a channel formed by two spaced apart legs of the second connector to align the first connector set. Then securing the aligned connector set by inserting a fastener through an aligned passageway formed through one first connector and both legs of the second connector, thereby securing the suspension to the frame.

In yet another aspect, a suspension attachment system is provided that may include a hanger bracket of a suspension, a frame interface device, and a first connector set. The first connector set may include two first connectors that may straddle a second connector when the first connector set is aligned. A fastener may secure the aligned connector set together. The suspension may be secured to the vehicle frame as a result of the aligned and secured first connector set.

In yet another aspect, a suspension attachment system is provided that may include a hanger bracket of a suspension, a frame interface device, and a first connector set. The first connector set may include two second connectors that may straddle a first connector when the first connector set is aligned.

Each of the first and second connectors may include a generally tubular portion and each of the second connectors is near an end of the first connector tubular portion. A fastener may secure the aligned connector set together. The suspension may be secured to the vehicle frame as a result of the aligned and secured first connector set.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIG. 5b is a representative partial cross-sectional view of an attachment between the suspension and the interface device of FIG. 5a.

FIG. 5c is another representative partial cross-sectional view of an attachment between the suspension and the interface device of FIG. 5a.

FIG. 7b is a representative partial cross-sectional view of an attachment between the suspension and the interface device of FIG. 7a.

FIGS. 8-11a are each representative perspective views of a suspension and yet another interface device which can embody principles of this disclosure.

FIG. 11b is a representative partial cross-sectional view of an attachment between the suspension and the interface device of FIG. 11a.

DETAILED DESCRIPTION

Figure 1:
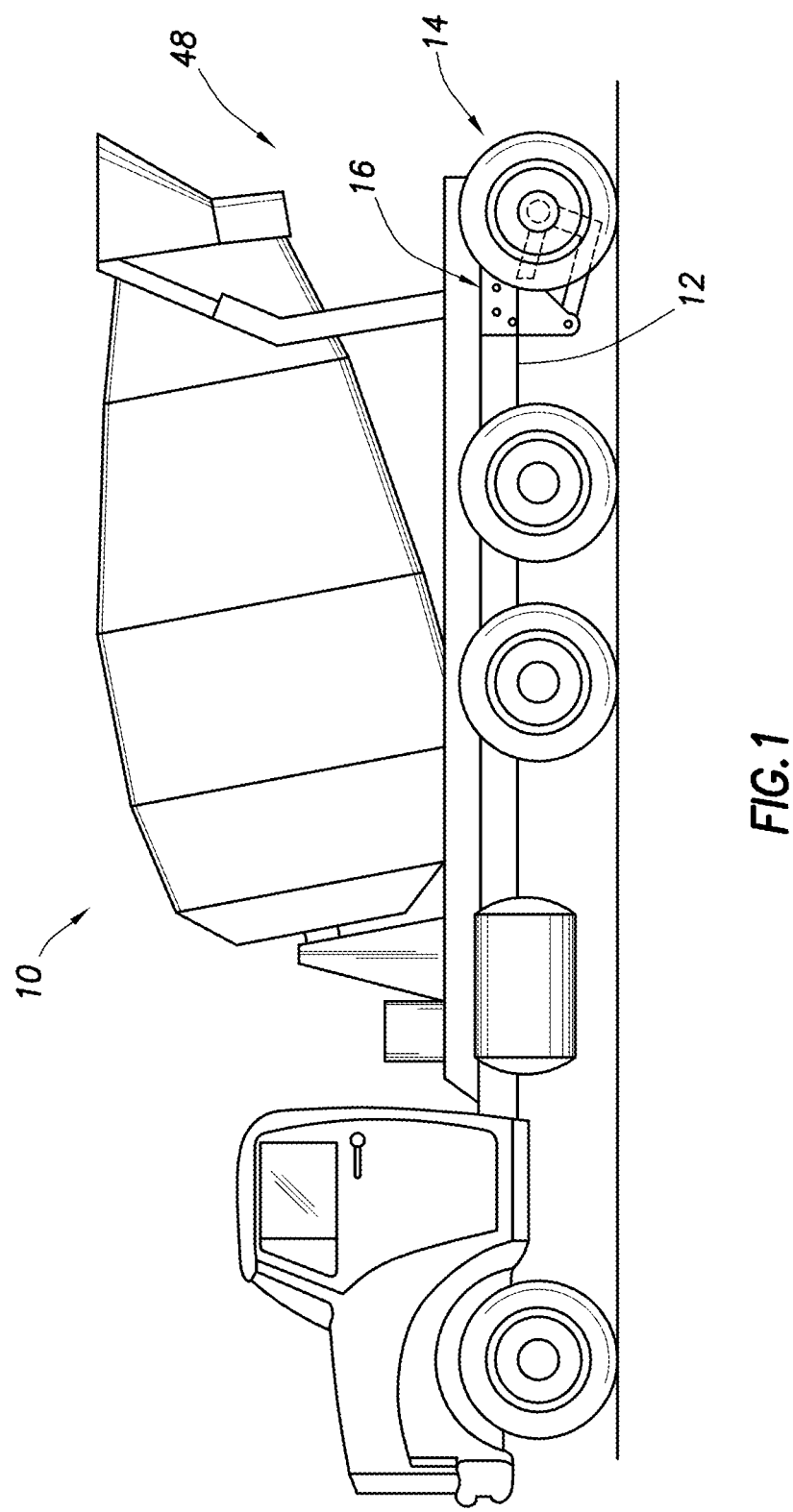
FIG. 1 is a representative side view of a vehicle which can embody principles of this disclosure.

Representatively illustrated in FIG. 1 is a suspension attachment system 48 and a related method for attaching a suspension 14 to a vehicle frame 12, which system and method can embody principles of this disclosure. In the example depicted in FIG. 1, the system 48 includes an interface device 16 and is used with a vehicle 10 illustrated as a cement delivery truck. However, it should be understood that the interface device 16 can be utilized in other vehicles (such as a motor coach, a dump truck, heavy-duty all-terrain vehicles, etc.). The vehicle 10 is merely a representative example in which the device 16 may be used. Therefore, it should be understood that the device 16 is not restricted to the example shown in FIG. 1.

Figure 2:
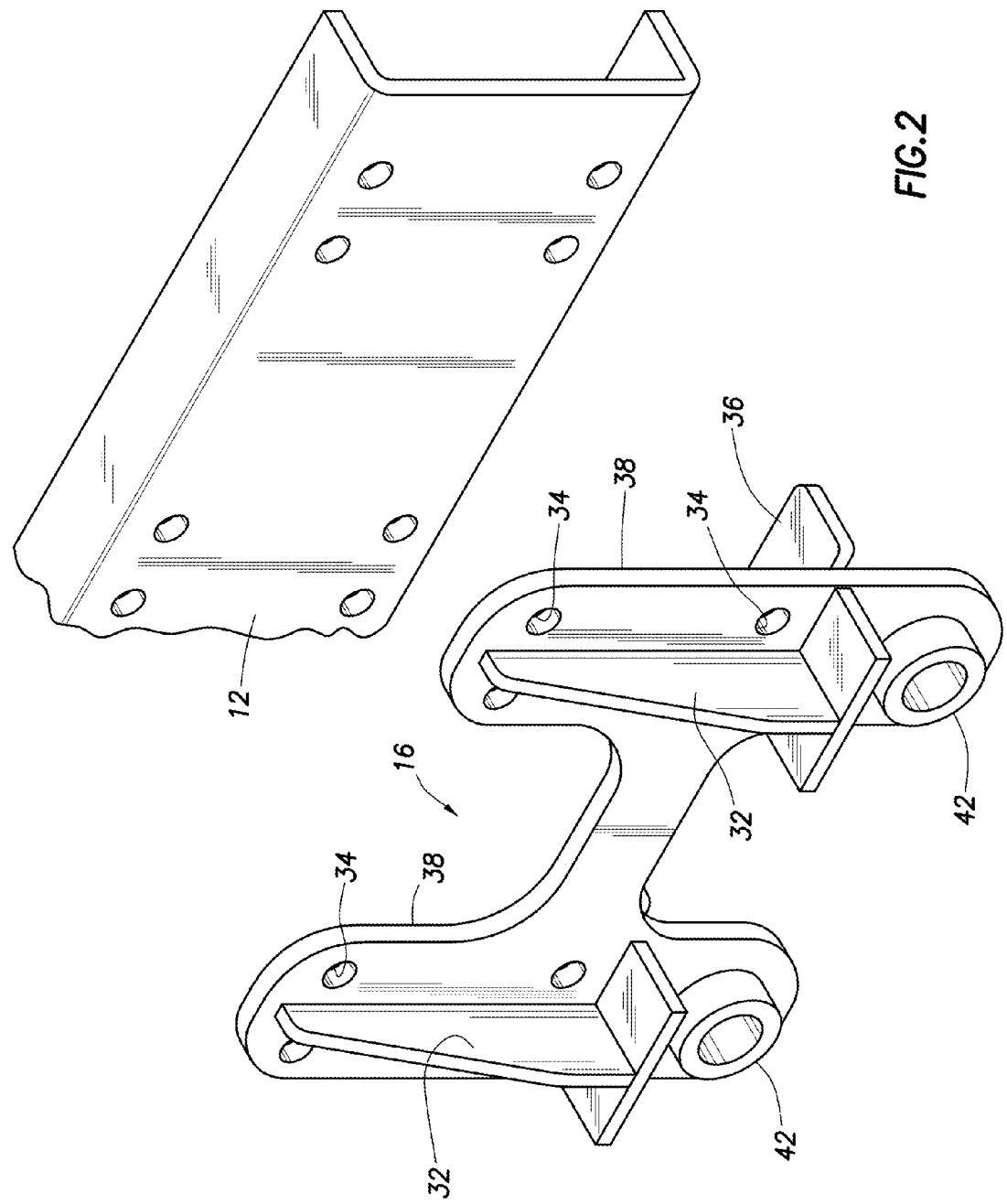
FIG. 2 is a representative perspective view of an interface device which can embody principles of this disclosure.

FIG. 2 representatively illustrates a configuration of the interface device 16. The device 16 provides an intermediate attachment for assembling a suspension 14 to a vehicle frame 12. It is preferable for the device 16 to be attached to the vehicle frame 12 prior to attaching the suspension 14 to the device 16. However, it is not necessary that the device 16 be attached to the frame 12 prior to attaching the suspension 14 to the device 16.

For example, the device 16 may be attached to the suspension 14 prior to attaching the device to the frame 12. Additionally, the device 16 may be removably attached to the frame 12 for alignment and marking of the frame for later reattachment. After alignment, the device 16 is removed from the frame 12, attached to the suspension 14, and then reattached to the frame 12.

Therefore, it can readily be seen that the interface device 16 can be attached to the suspension 14 and/or the frame 12 in any sequence in keeping with the principles of this disclosure.

Instead of using the interface device 16, the suspension 14 could be directly attached to the vehicle frame 12, but that can be labor intensive and awkward due to the size and weight of the suspension 14. However, attachment of the device 16 to the frame 12 before attaching suspension 14 to the device greatly simplifies a process of attaching the suspension to the frame.

The device 16 is lighter and more manageable than the suspension 14. Therefore, it may be simpler for an assembler to align the device 16 to the appropriate location on the frame 12 and attach the device to the frame, rather than aligning a hanger bracket 22 of the suspension 14 directly to the frame for attachment.

Surfaces 36, 38 of the interface device 16 are positioned against the vehicle frame 12 as the device is aligned to the frame for attachment. However, it is not a requirement that surfaces 36, 38 be positioned against the vehicle frame 12. For example, surface 36 may not be against the frame 12 if the device 16 is attached to the frame 12 such that a gap exists between the frame 12 and the surface 36. Additionally, spacers (e.g. washers, etc.) may be installed between surface 38 and the frame 12 when device 16 is attached to the frame, which may prevent surface 38 from being against the vehicle frame.

Therefore, it can readily be seen that it is not a requirement that surfaces 36, 38 be positioned against the vehicle frame 12. Additionally, gussets or supports 32 may be included in the device 16 to provide increased strength and stability.

The device 16 may include holes 34 which can be used to align the device to the vehicle frame 12 and secure the device 16 to the frame by using fasteners such as bolts, pins, rivets, etc. The device 16 may also (or alternatively) be secured to the frame 12 by welding, brazing, clamping, etc. The device 16 includes connectors 42 which align with connectors 40 on the suspension 14.

Figure 3A:
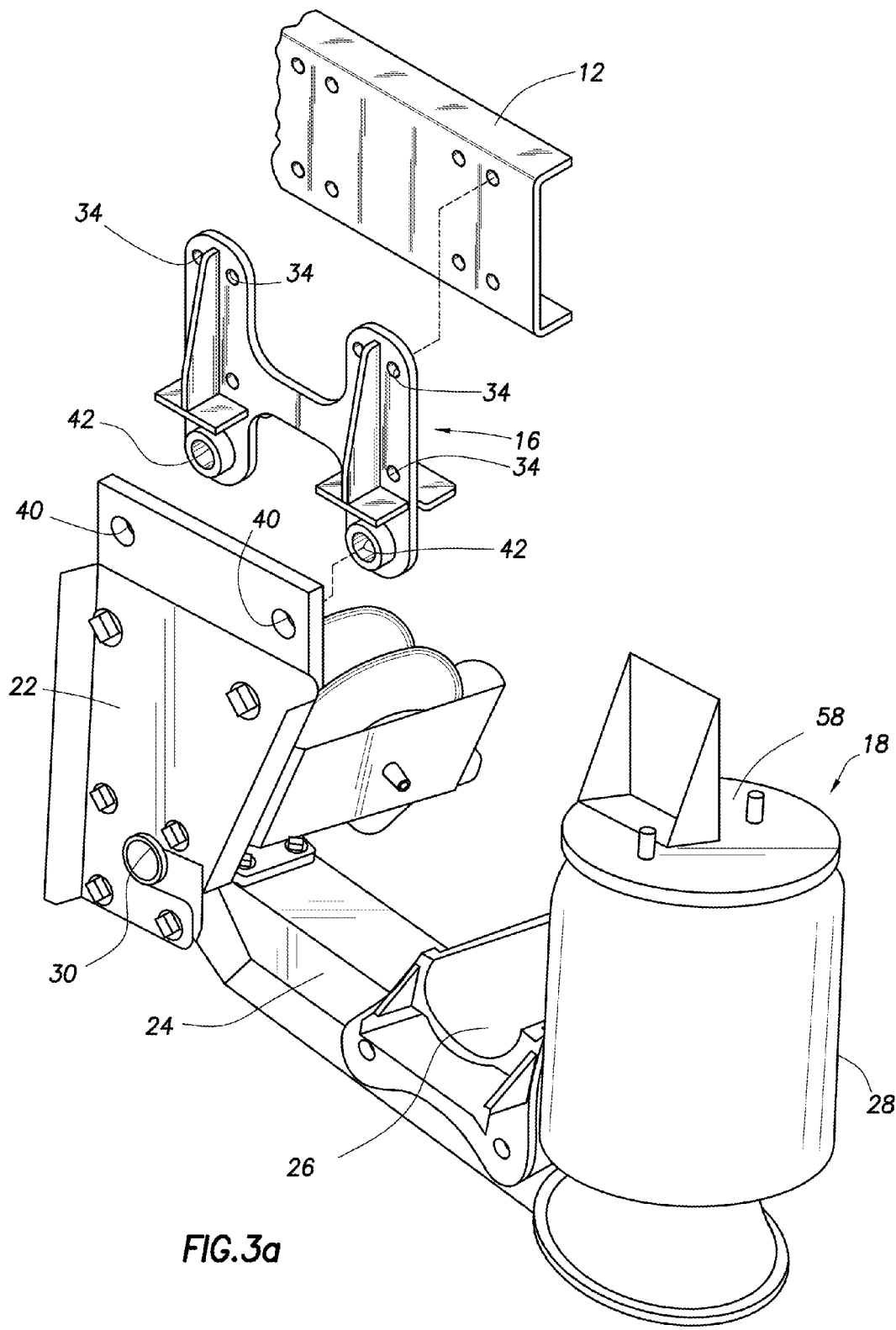
FIG. 3a is a representative perspective view of one type of suspension, the interface device of FIG. 2, and a portion of a vehicle frame.
Figure 3B:
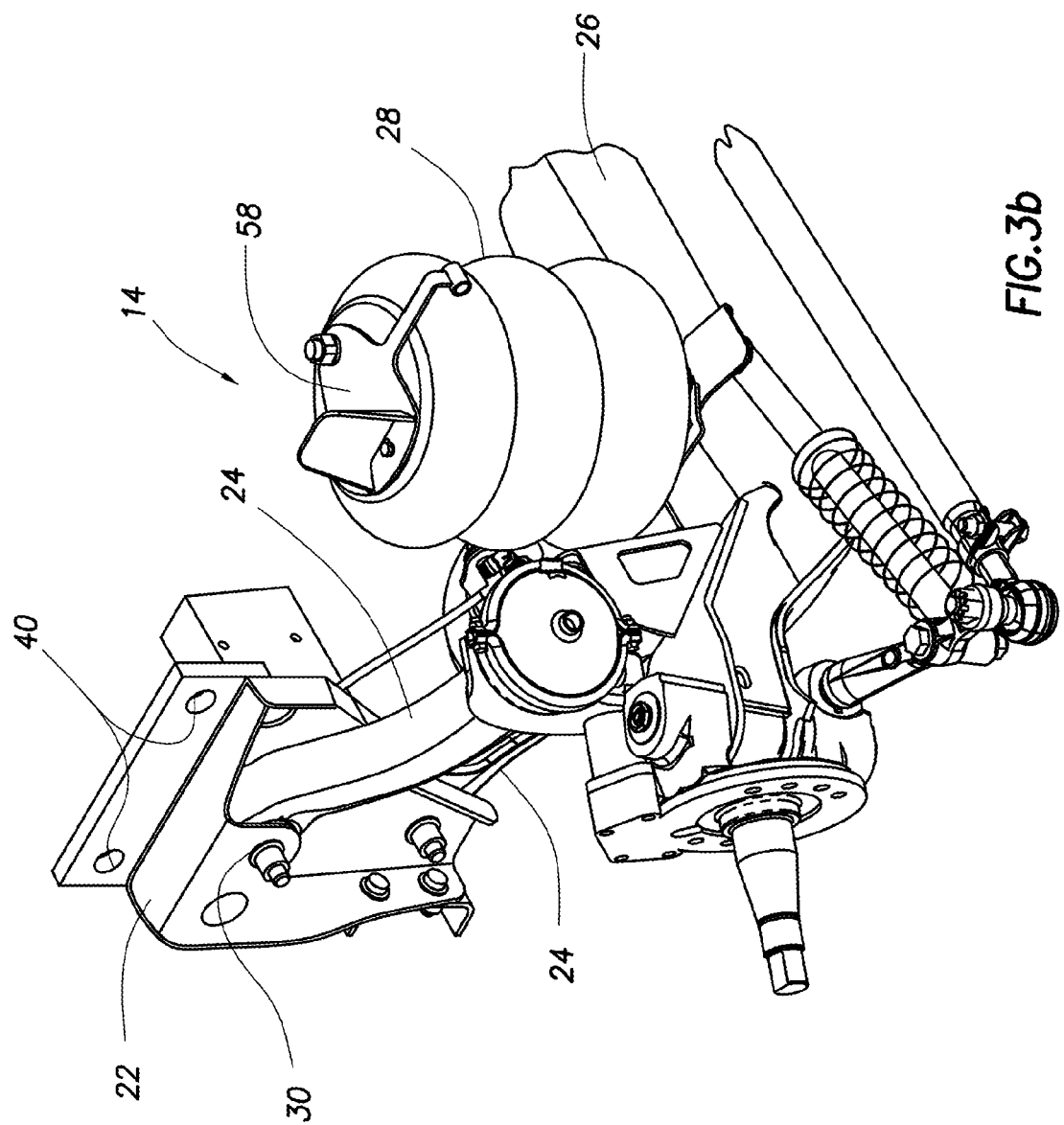
FIG. 3b is a representative perspective view of another type of suspension that may attach to the interface device of FIG. 2.
Figure 3C:
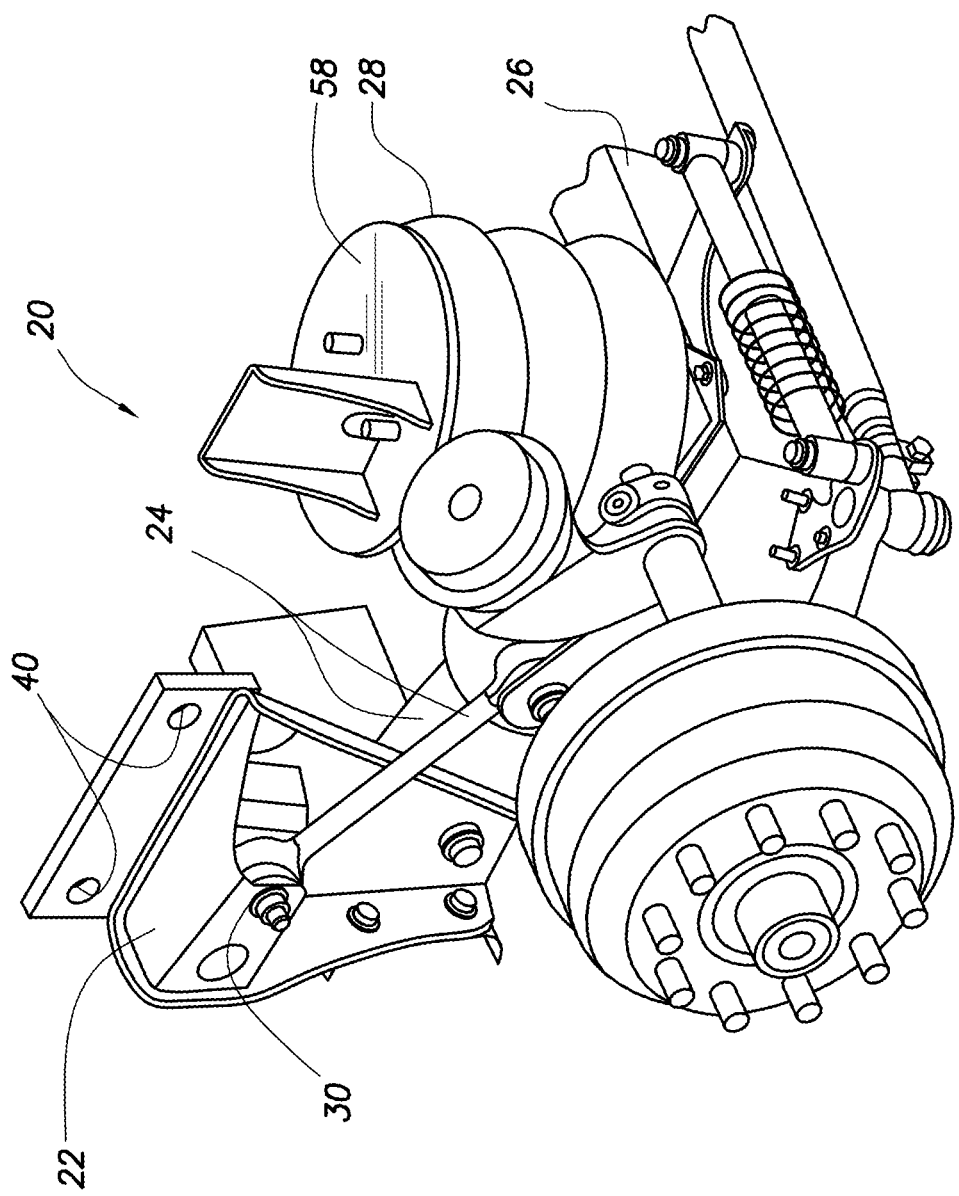
FIG. 3c is a representative perspective view of yet another type of suspension that may attach to the interface device of FIG. 2.

The attachment system 48 can be used to attach various types of suspension systems to the vehicle 10 in keeping with the principles of this disclosure. Referring additionally now to FIGS. 3a-c, a left side of three different suspensions 14, 18, 20 are shown. A right side of each suspension 14, 18, 20 has been omitted to simplify the illustrations, but it should be understood that both the left and right sides are preferably included when each of the suspensions 14, 18, 20 is assembled to the vehicle 10.

The suspensions 14, 18, 20 are of different shapes and sizes and are each adapted to mate with the device 16. This provides flexibility to a vehicle manufacturer for assembling vehicle suspensions, and may increase efficiency and reduce costs.

Each of the suspensions 14, 18, 20 include the hanger bracket 22, which includes the connector(s) 40. The hanger bracket 22 also includes a pivot 30 for pivotably attaching arms 24 of the suspensions 14, 18, 20 and the arms 24 are also pivotably attached to an axle 26. The hanger bracket 22 is a portion of the suspension 14 that interfaces with the interface device 16 for attaching the suspension 14 to the vehicle frame 12.

Connectors 42 of the interface device 16 align with connectors 40 on the hanger bracket 22 to secure any one of the suspensions 14, 18, 20 to the interface device 16. These connectors 40, 42 provide a significant reduction in the complexity required in aligning and attaching the suspensions 14, 18, 20, by simplifying the attachment of the hanger bracket 22 to the frame 12. Once the device 16 is attached to the frame 12, the hanger bracket 22 of the suspension 14 is connected to the device 16.

Figure 4:
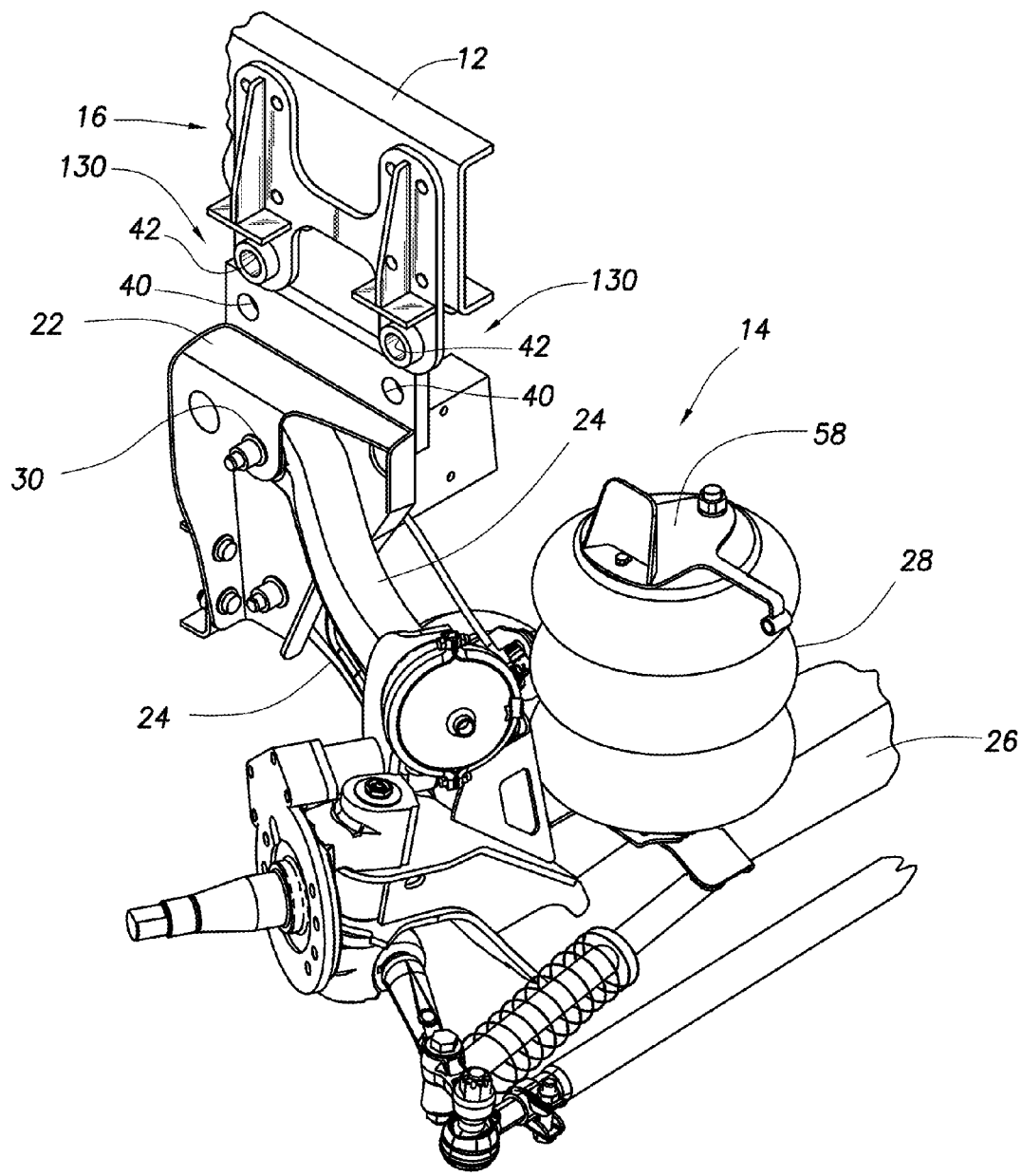
FIG. 4 is a representative perspective view of a suspension prior to being attached to the interface device.

Referring additionally now to FIG. 4, the suspension 14 is shown prior to aligning the connectors 40, 42. The suspension 14 is maneuvered into position under the vehicle frame 12 and lifted to align the connectors 40 on the suspension 14 with the connectors 42 on the device 16.

Figure 5A:
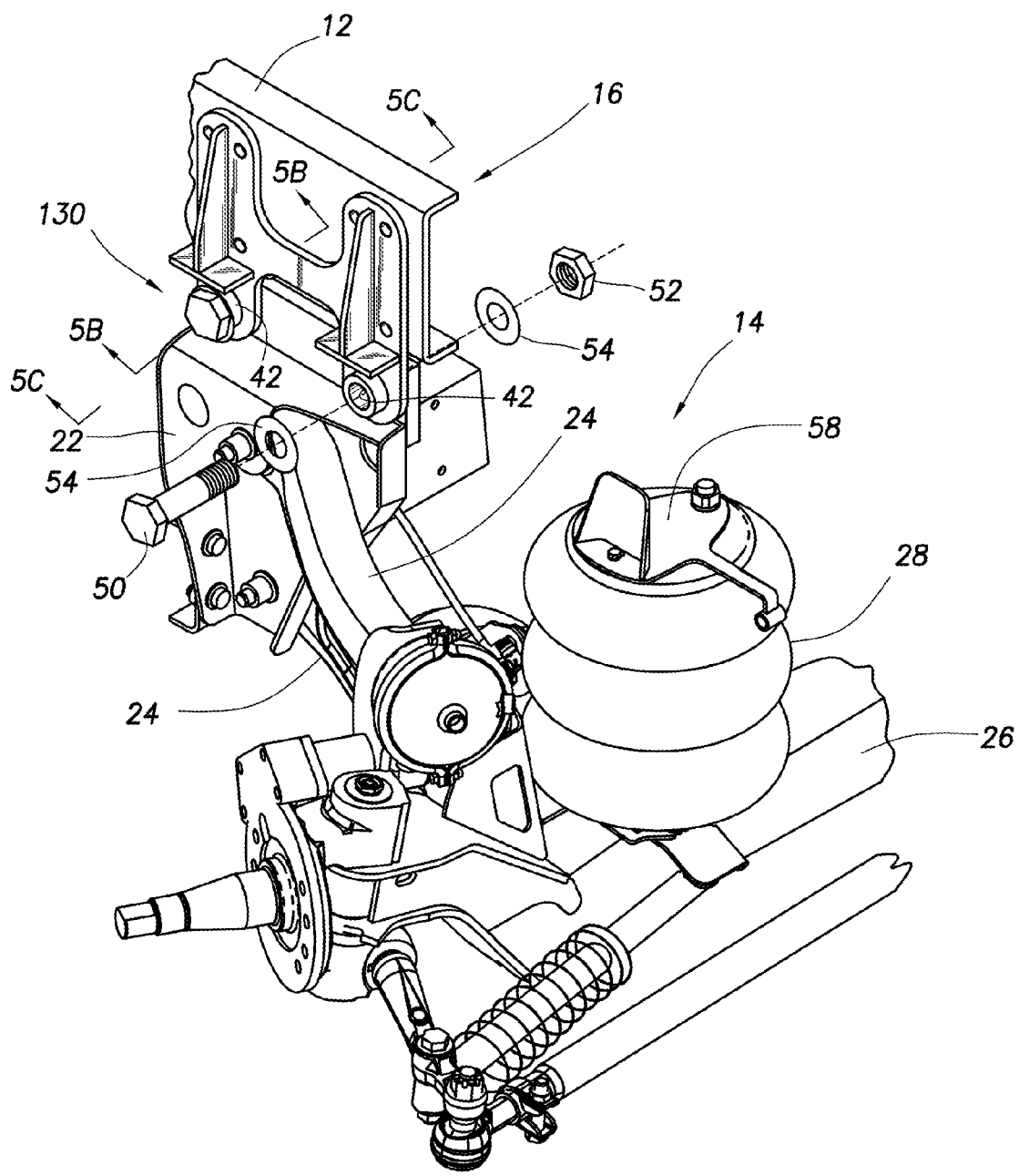
FIG. 5a is a representative perspective view of the suspension after being attached to the interface device.

Referring additionally now to FIG. 5a, the suspension 14 is shown after aligning the connectors 40, 42 together. After being aligned, the connectors 40, 42 are secured together by welding, by one or more fasteners (e.g., bolts, hucks, pins, rods, etc.), by clamping, etc. However, for illustration purposes, FIG. 5a shows the connectors 40, 42 secured by a bolt 50, a nut 52, a tapered spacer 56 (see FIG. 5b) and a washer 54.

Figure 5B:
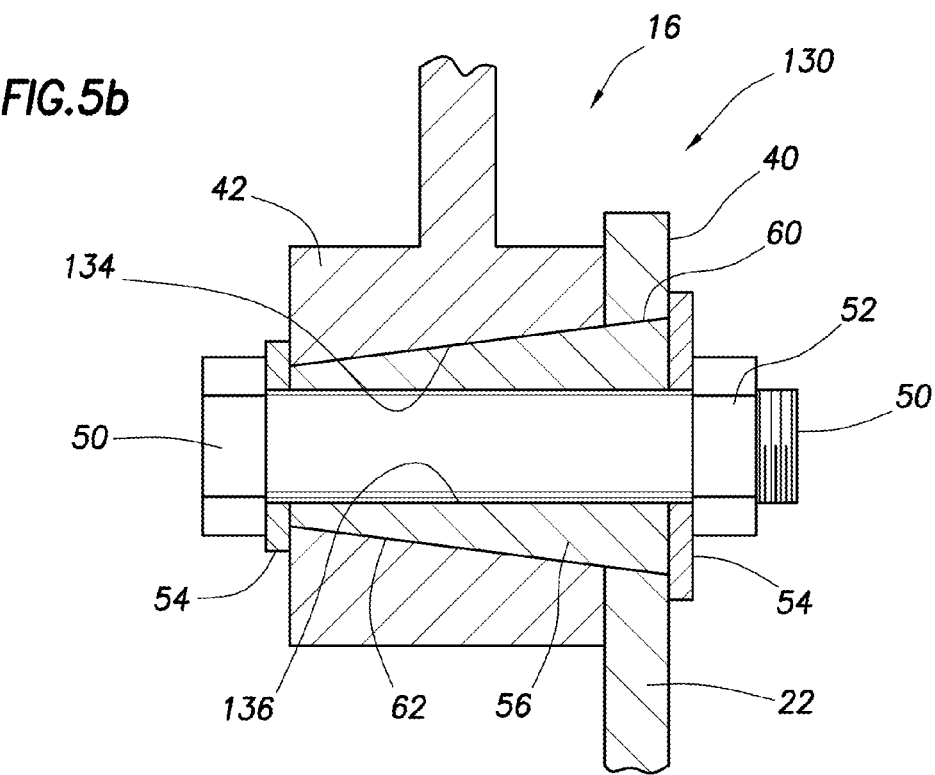

Referring additionally now to FIG. 5b, a cross-sectional view of a connector set 130 with aligned and secured connectors 40, 42 is shown. The connector 40 is aligned with the connector 42, and then a tapered spacer 56 is inserted into the aligned connectors 40, 42. This tapered spacer 56 simplifies assembly of the suspensions 14, 18, 20 to the vehicle frame 12 by allowing tapered openings 60, 62 in the connectors 40, 42, respectively, to form a loosely aligned tapered passageway 134 through the aligned connectors 40, 42.

The hanger bracket 22 is positioned such that connector 40 is approximately aligned with connector 42. The connector 40 may include a tapered opening 60 that is larger than a diameter of the spacer 56. The bolt 50, with optional washer 54, is inserted through a tapered opening 62 of connector 42 and then through the tapered opening 60 of connector 40. The loosely aligned openings 60, 62 form the loosely aligned tapered passageway 134 through the connectors 40, 42.

The tapered spacer 56 includes an internal longitudinal passageway 136 that receives the bolt 50. The tapered spacer 56 is then inserted onto the bolt 50 and forced into the loosely aligned tapered passageway 134 with the bolt 50 carrying an optional washer 54. The taper of openings 60, 62 generally match the taper of the spacer 56.

Forcing the tapered spacer 56 into the loosely aligned tapered passageway 134 locates the connector 40 into a desired position relative to the connector 42, thereby precisely aligning the connectors 40, 42. The nut 52, with another optional washer 54, is threadably attached to the bolt 50 to secure the hanger bracket 22 to the device 16.

However, it is not a requirement to use a tapered spacer 56 to secure the connectors 40, 42, nor is it required that the openings 60, 62 be tapered.

Figure 5C:
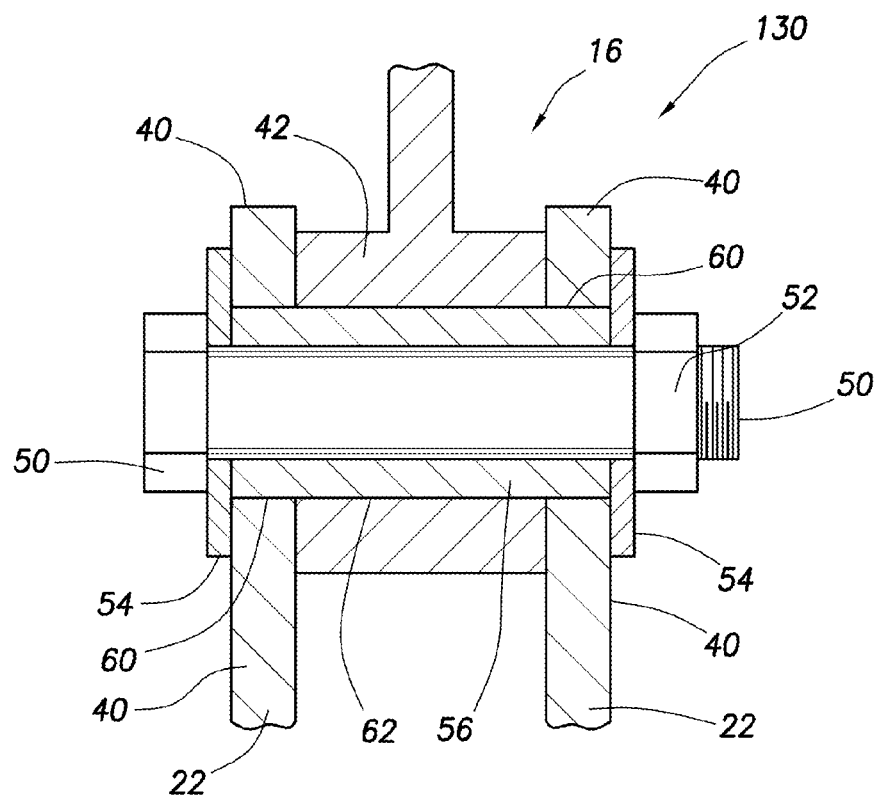

Referring additionally now to FIG. 5c, another cross-sectional view of a connector set 130 with aligned and secured connectors 40, 42 is shown. Connectors 40, 42 have openings that fit tightly to the bolt 50. A non-tapered spacer 56 may be inserted into a non-tapered opening 62 and used to align connectors 40, 42 prior to inserting a fastener. Also (or alternatively), the bolt 50 can be used to align connectors 40, 42, without using a spacer 56, by inserting the bolt 50 into the non-tapered opening 62. Therefore, it may readily be seen that there are various ways in which the connectors 40, 42 can be aligned and secured together in keeping with the principles of this disclosure.

Additionally, the hanger bracket 22 of suspension 14 may mate to the device 16 differently than the hanger bracket 22 of the other suspensions 18, 20. For example, suspension 14 may mate to the device 16 as shown in FIG. 5b and described above. However, suspension 20 may mate to the device 16 as in FIG. 5c where a set of connectors 40 straddle and mate to a connector 42, as opposed to a single connector 40 as in FIG. 5b.

In FIG. 5c the connectors 40, 42, the openings 60, 62 and spacer 56 are not tapered. The connectors 40 are aligned with the connector 42 and then the non-tapered spacer 56 is inserted to locate the connectors 40, 42. The bolt 50, with washer 54, is then inserted through the non-tapered spacer 56. A nut 52 and washer 54 are secured to an end of the bolt 50. For this configuration, the bolt 50 is longer to accommodate an increased thickness of the connection due to the additional connector 40.

Additionally, the openings 60, 62 may be stepped, splined, etc., and the spacer 56 may be complementarily shaped in keeping with the principles of this disclosure.

Therefore, it may readily be seen that there are many ways in which the connectors 40, 42 can be secured together in keeping with the principles of this disclosure.

Figure 6:
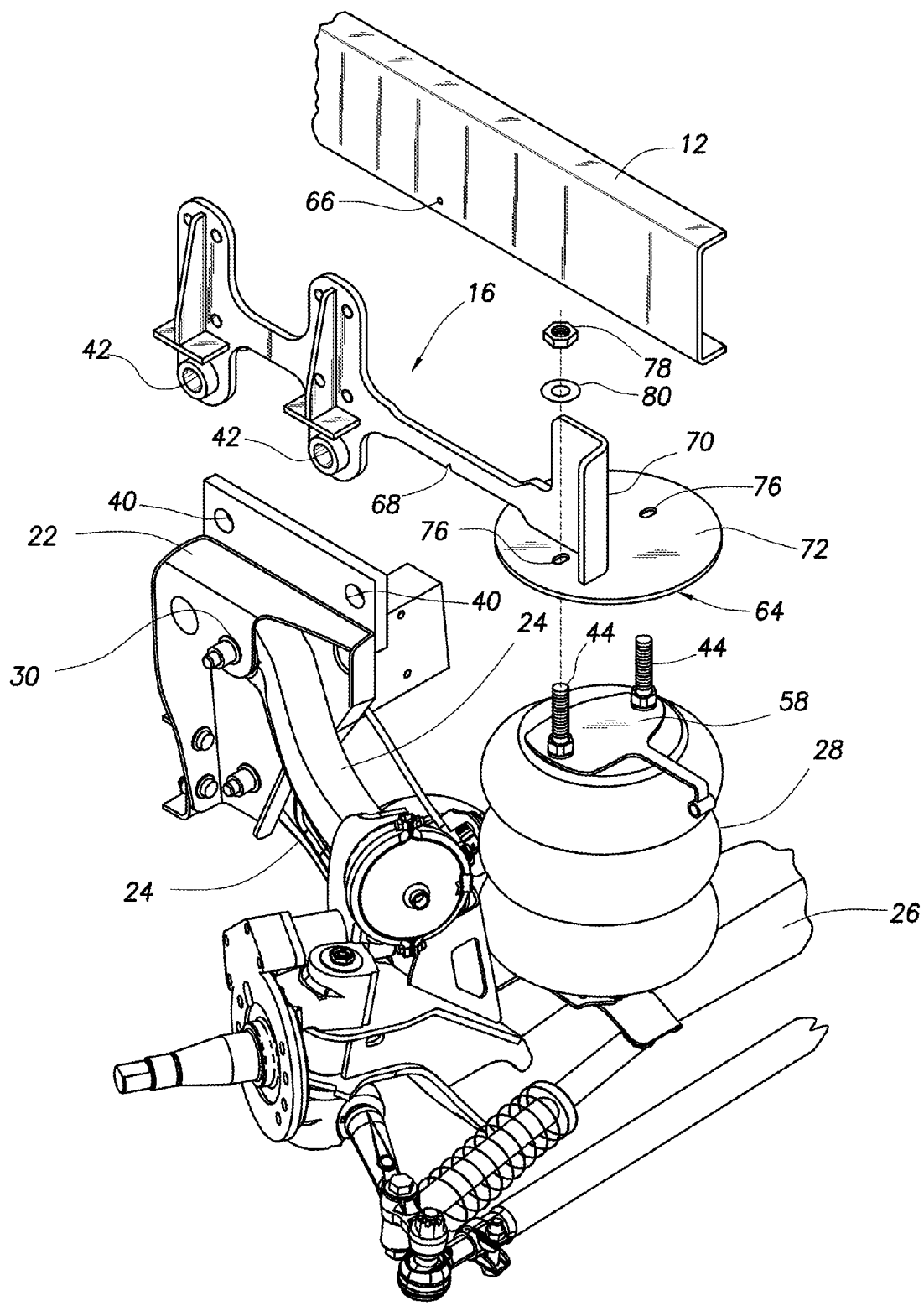
FIG. 6 is a representative perspective view of a suspension and another interface device which can embody principles of this disclosure.

Referring additionally now to FIG. 6, the interface device 16 includes an interface connector 64 and an alignment indicator 68. In this configuration of the device 16, the device alignment indicator 68 is used to longitudinally align the interface device 16 with an axle alignment indicator 66 on the vehicle frame 12.

The axle alignment indicator 66 and the device alignment indicator 68 are preferably positioned such that, when the device alignment indicator 68 is aligned with the axle alignment indicator 66, the axle 26 will be at a desired longitudinal position upon connecting the suspension 14 to the interface device 16. The longitudinal position of the device 16 when it is attached to the frame 12 is determined by the desired longitudinal position of the axle 26 relative to the vehicle frame.

Suspensions with different dimensions (see FIGS. 3a-c) may have different longitudinal positions for the alignment indicators 66, 68. The position of the axle alignment indicator 66 and/or the position of the device alignment indicator 68 can be varied to adjust for these different dimensions and to position the axle 26 in the desired longitudinal position relative to the frame 12.

The interface connector 64 attaches to an air spring bracket 58 for securing an air spring 28 to the frame 12. Therefore, the device 16 may also provide an intermediate attachment between the air spring 28 and the frame 12.

Surfaces 70 and 72 of the interface device 16 are positioned against the vehicle frame 12 as the device is aligned to the frame for attachment. However, it is not a requirement that surfaces 70, 72 be positioned against the vehicle frame 12. For example, surface 72 may not be against the frame 12 if the device 16 is attached to the frame 12 such that a gap exists between the frame 12 and the surface 72. Additionally, spacers (e.g. washers, etc.) may be installed between surface 70 and the frame 12 when device 16 is attached to the frame, which would prevent surface 70 from being against the vehicle frame.

Therefore, it can readily be seen that it is not a requirement that surfaces 70, 72 be positioned against the vehicle frame 12.

Once the interface device 16 is positioned on the frame 12 the surfaces 36, 38, 70, 72 may be in contact with the frame 12. The device 16 is attached to the frame and then the hanger bracket 22 is attached to the interface device 16 by aligning and securing (via by fasteners, welding, etc.) connectors 40, 42 together, thereby securing the hanger bracket 22 to the device 16. Also, the air spring bracket 58 is attached to the connector 64, thus securing the air spring 28 to the vehicle frame 12. However, the air spring bracket 58 may be attached directly to the frame 12 without using the connector 64.

FIG. 6 shows that the air spring 28 is attached to the device 16 by connectors 44 on the air spring bracket 58. The connectors 44 are inserted into connectors 76 in the interface connector 64 and secured by nuts 78 and washers 80. However, it should be readily understood that any attachment means could be used to attach the air spring bracket 58 to the interface connector 64.

It should also be readily understood that it is not necessary to have an air spring bracket 58. The interface connector 64 may be attached directly to the air spring and therefore, no air spring bracket 58 would be needed.

Referring additionally now to FIGS. 7a-11b, the interface device 16 of these figures is similar to the interface device of FIG. 4, except that the connectors 40, 42 are configured differently. Please note that the frame 12 is omitted from these figures for simplicity.

These figures illustrate various examples of attaching the hanger bracket 22 to the interface device 16 in keeping with the principles of this disclosure. FIGS. 7a-11b are merely representative examples of ways to attach the hanger bracket 22 to the device 16. Therefore, it should be understood that the attachment of the hanger bracket 22 and the device 16 are not restricted to the examples given in these figures.

Figure 7A:
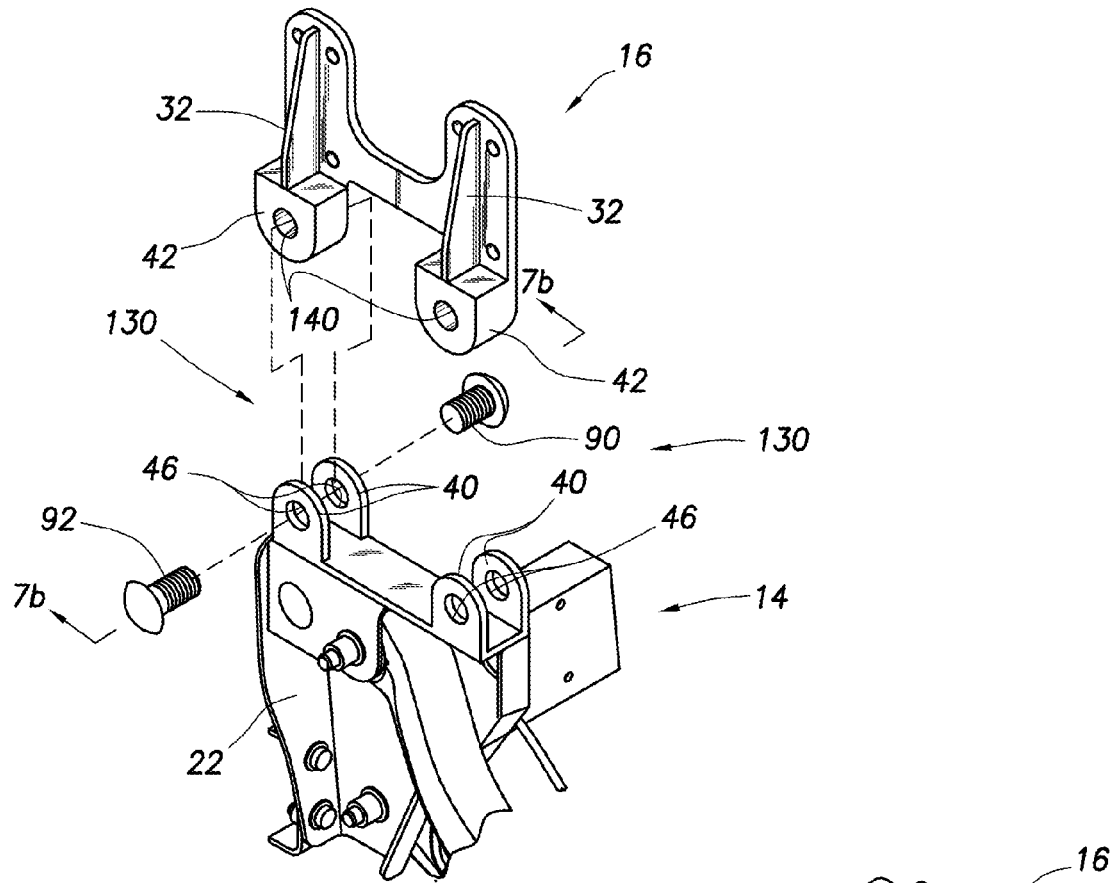
FIG. 7a is a representative partial perspective view of a suspension and yet another interface device which can embody principles of this disclosure.
Figure 7B:
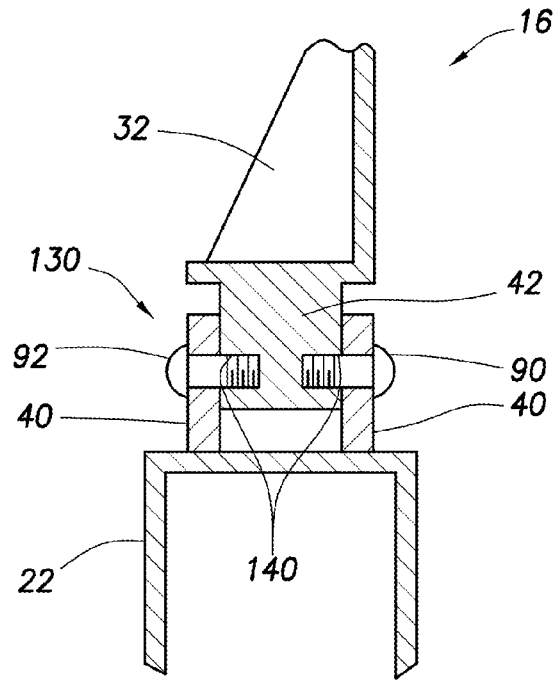

In FIG. 7a, two connector sets 130 are shown. The connectors 42 are shown to be generally perpendicular relative to the frame 12. Each connector set 130 has a connector 42 straddled by two connectors 40. When the connectors 40, 42 of each connector set 130 are aligned, fasteners 90, 92 are inserted through the connectors 40 and screwed into threaded openings 140 on opposite ends of the connector 42. A cross-sectional view of this connection is shown in FIG. 7b.

Figure 8:
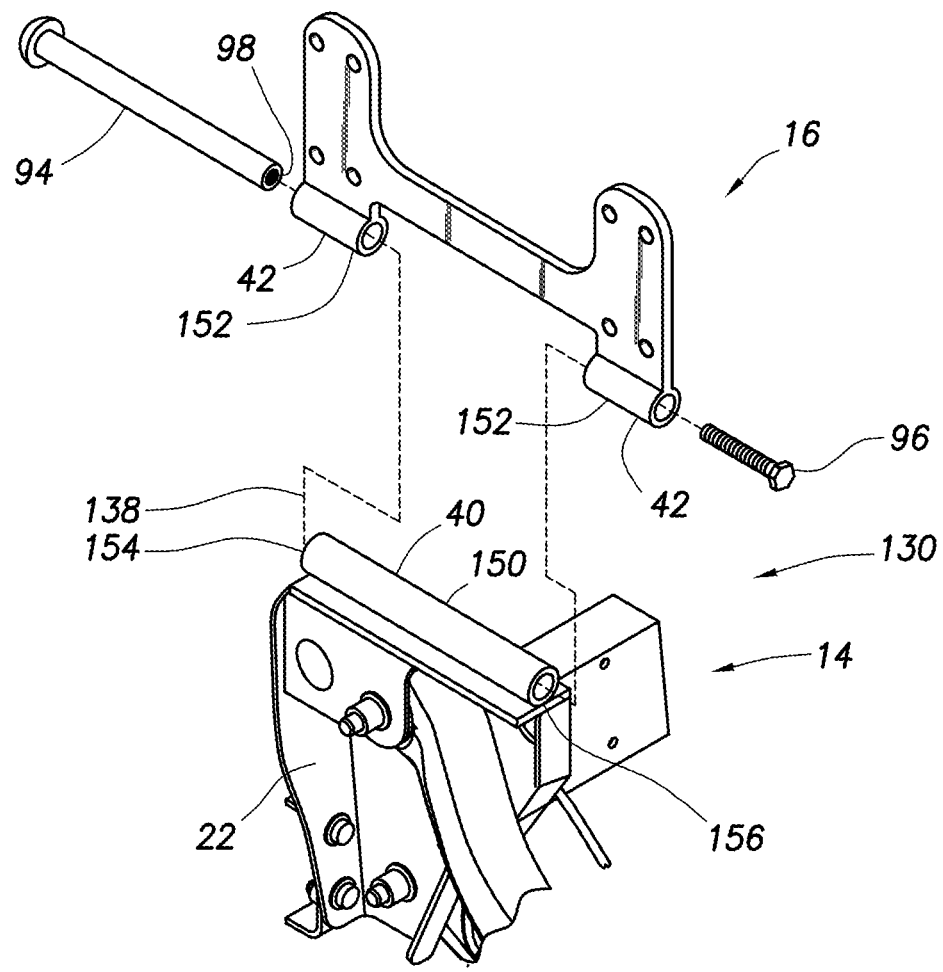

In FIG. 8, one connector set 130 is shown. The connectors 40, 42 are shown to have generally tubular portions 150, 152, respectively. These tubular portions 150, 152 are shown to be generally parallel to the frame 12. The tubular portion 150 of connector 40 is positioned and aligned between generally tubular portions 152 of the connectors 42. One tubular portion 152 is positioned proximate an end 154 of the tubular portion 150. Another tubular portion 152 is positioned proximate an end 156 of the tubular portion 150. A rod 94 is then inserted through the aligned passageway 138 formed by the aligned connectors 40, 42.

The rod 94 is secured in place by a retainer 96 which can be screwed into threads 98 in an end of the rod 94. However, it is not required to use a retainer 96 to secure the rod 94 in place. For example, a nut may be installed on a threaded end of the rod 94, or a cotter pin may be inserted through a hole in an end of the rod 94, or any other suitable means may be used to secure the rod 94 in place. Therefore, it can readily be seen that many retainer options may be used in keeping with the principles of this disclosure. Please note that the support 32 is not included in this device 16 to illustrate that it is not necessary that the device 16 include the support 32.

Figure 9:
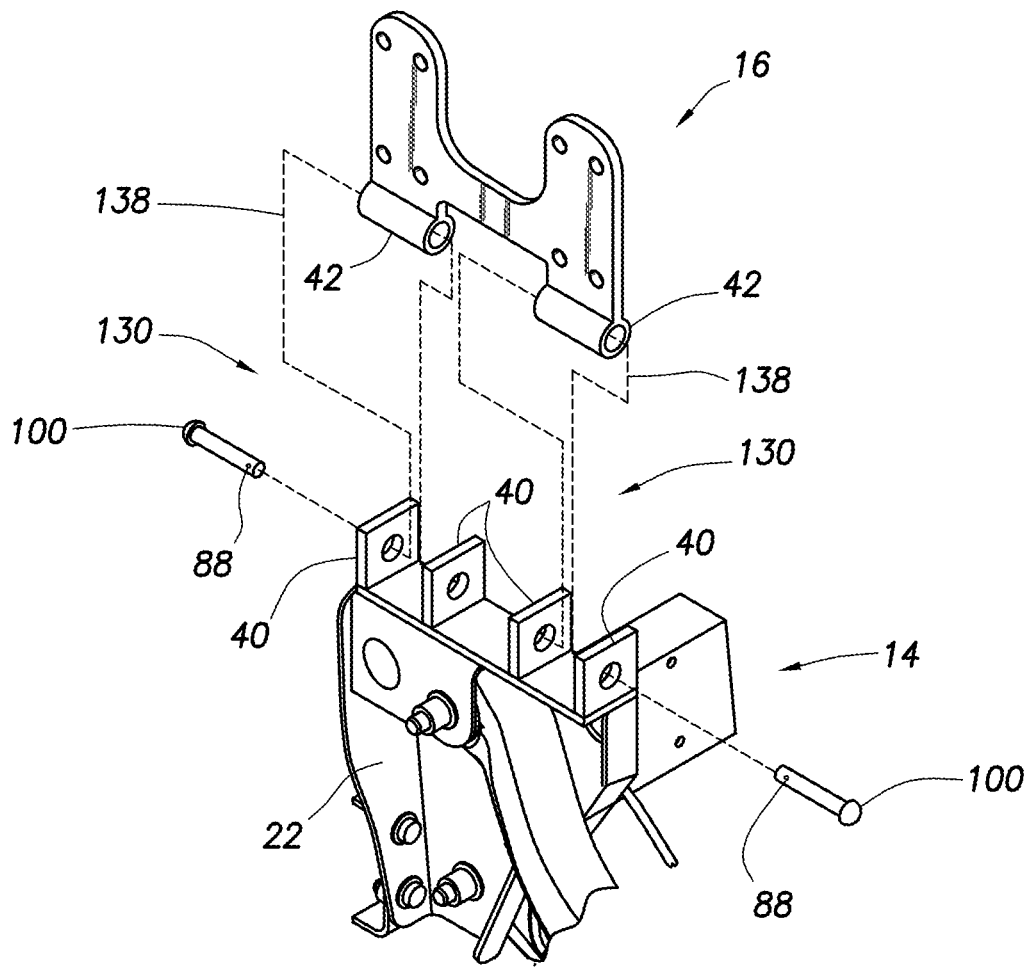

In FIG. 9, two connector sets 130 are shown. The connectors 42 are shown to be generally parallel relative to the frame 12. Each connector set 130 has a connector 42 straddled by two connectors 40. When the connectors 40, 42 of each connector set 130 are aligned, a pin 100 is inserted through each aligned passageway 138 of each connector set 130 when the connectors 40, 42 in each connector set 130 are aligned. The pin 100 includes a hole 88 through an end of the pin 100 in which a retainer 88 is inserted to hold the pin 100 in place after insertion through the aligned passageway 138.

However, it is not required to use a retainer 88 to secure the pin 100 in place. For example, a nut may be installed on a threaded end of the pin 100, an e-ring may be inserted in an annular groove around an end of pin 100, or any other suitable means may be used to secure the pin 100 in place. Therefore, it can readily be seen that many retainer options may be used in keeping with the principles of this disclosure.

Figure 10:
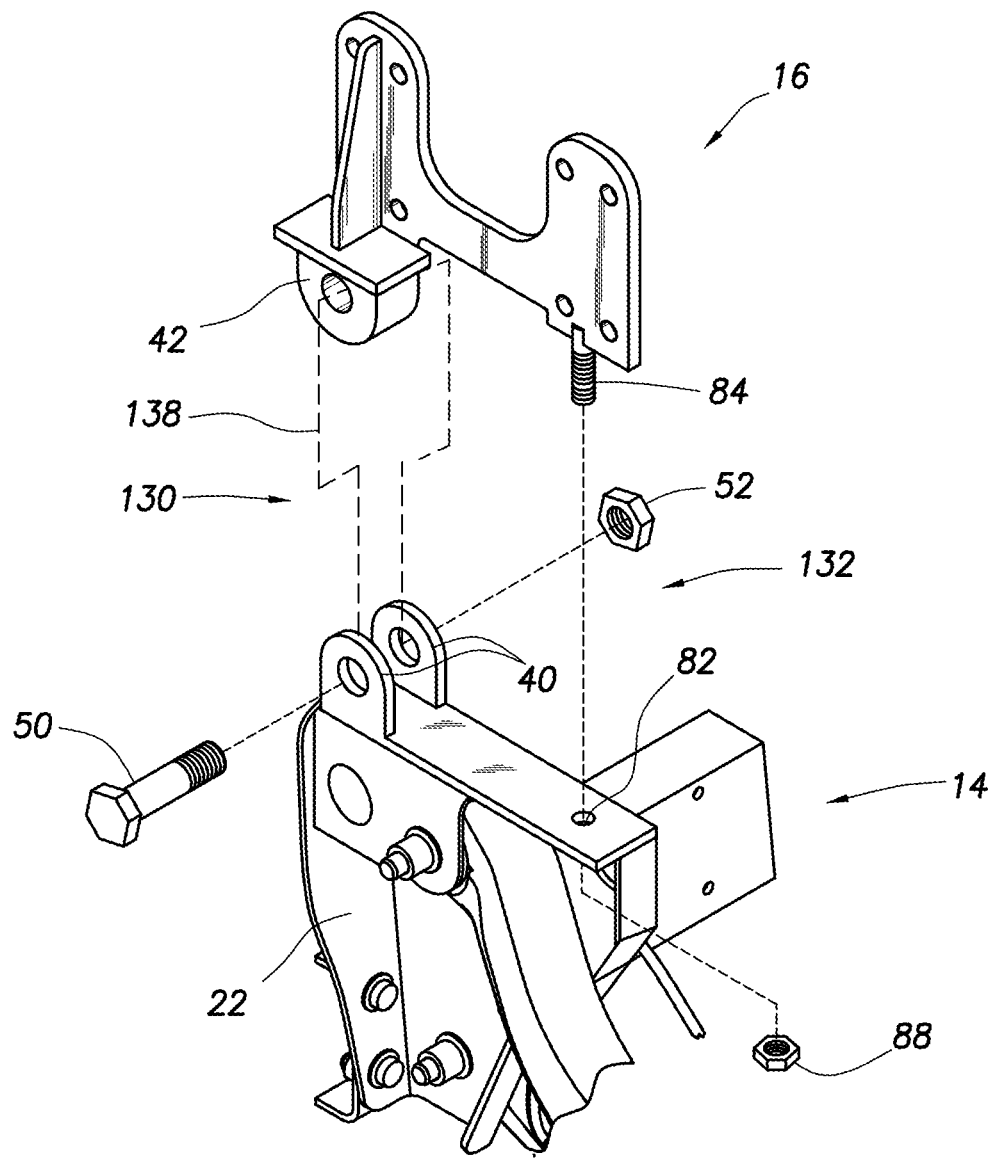

In FIG. 10, the configuration of connectors 40, 42 is very similar to FIG. 7a, except that there is only one connector set 130, whereas FIG. 7a has two connector sets. Also, when the connectors 40, 42 are aligned, instead of using screws 90, 92, the bolt 50 is inserted through the aligned passageway 138 and held in place by the nut 52 (the washer 54 is optional). Another connector set 132 is also shown in FIG. 10. The connector set 132 may include connectors 82, 84. The connector 42 of connector set 130 is fixed to one end of the device 16 and the connector 84 of the connector set 132 is fixed to another end of the device 16.

The connectors 40 of the connector set 130 are fixed to one end of the hanger bracket 22 and the connector 82 of the connector set 132 may be formed in another end of the hanger bracket 22. When the connectors 40, 42 of connector set 130 are aligned, then the connector 84 is inserted into the connector 82 and secured in place by a retainer 88 (e.g. nut, a cotter pin, an e-ring, a threaded fastener, etc.).

Figure 11A:
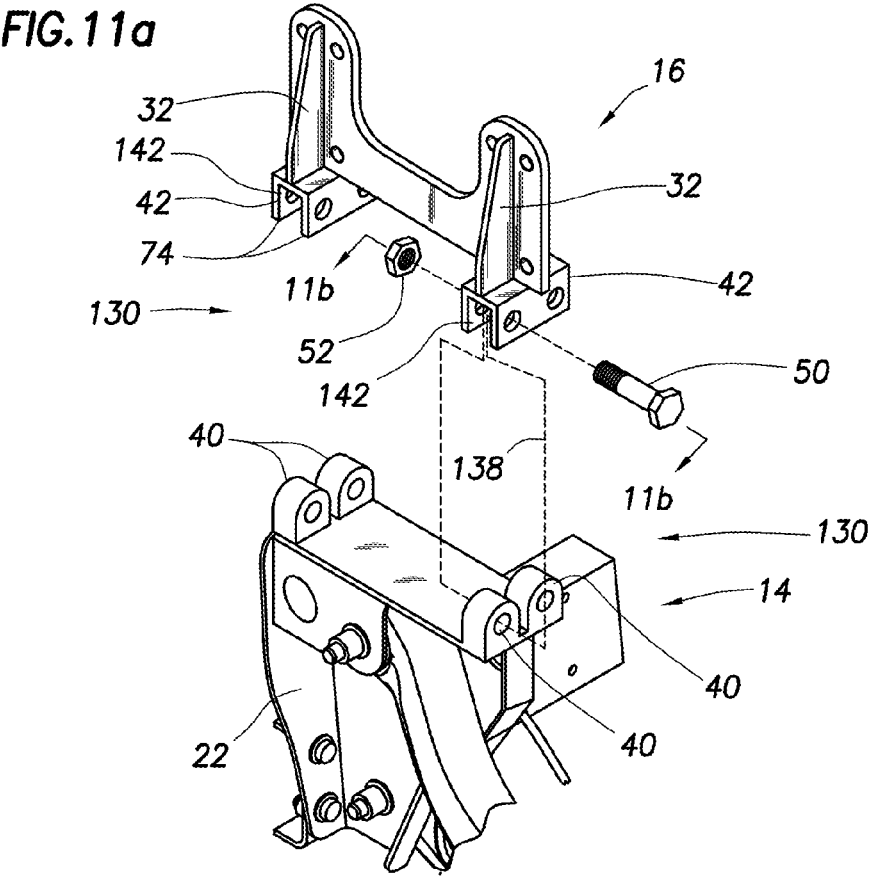
Figure 11B:
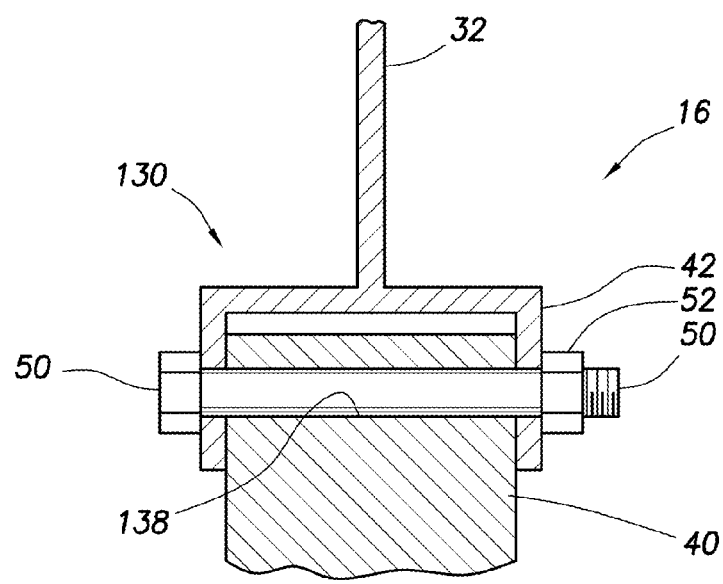

In FIG. 11a, two connector sets 130 are shown. The connectors 42 are shown to be generally perpendicular relative to the frame 12. Each connector set 130 has one connector 42 and two connectors 40. Each connector 42 has two legs 74 which are spaced apart to form a channel 142 between the legs 74. The two connectors 40 are inserted side-by-side into the channel 142. This forms two aligned passageways 138 through each connector set 130. The bolt 50 is inserted through each passageway 138 when the connectors 40, 42 of the connector set 130 are aligned with each other. The nut 52 is used to secure each of the bolts 50 inserted through these connectors 40, 42. FIG. 11b shows a cross-sectional view of one of these connections.

It can readily be seen that there are many ways to provide connectors 40, 42 for attaching the hanger bracket 22 to the device 16. The configurations given above are merely examples of some of the configurations that are possible in keeping with the principles of this disclosure. Any of the configurations of the device 16 described in this disclosure may be used in place of any other configuration of the device 16.

Figure 12:
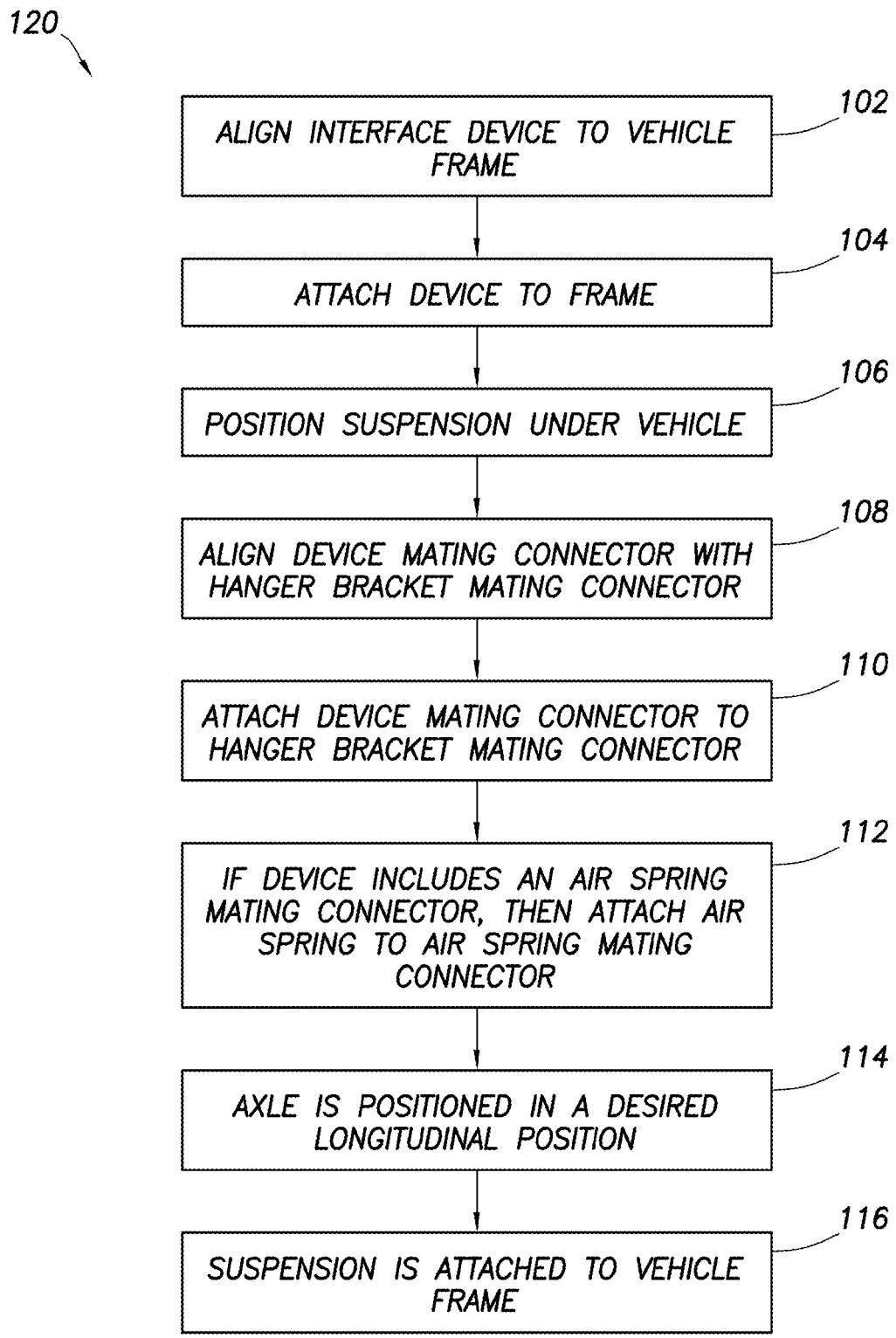
FIG. 12 is a representative flow chart for a method of attaching a suspension to a vehicle frame.

A flow chart of process steps of a method 120 is representatively illustrated in FIG. 12. The method 120 may be used with the system 48 described above to attach the suspension 14 to the frame 12, or the method may be used with other systems in keeping with the principles of this disclosure.

In step 102, the interface device 16 is aligned to the frame 12 of the vehicle 10. This alignment step may include longitudinally aligning a device alignment indicator 68 with an axle alignment indicator 66.

In step 104, once the device 16 is aligned to the frame 12, the device is attached to the frame by various attachment means, for example, fasteners, welding, clamping, a combination of these, etc. Any suitable technique for attaching the device 16 to the frame 12 may be used in keeping with the principles of this disclosure.

In step 106, a suspension 14, 18, 20 is positioned underneath the vehicle 10 in preparation for attachment to the device 16.

In step 108, connector 40 of the hanger bracket 22 is aligned with the connector 42 of the device 16. In step 110, the connectors 40 and 42 are attached to each other by various attachment means, such as fasteners, welding, clamping, a combination of these, etc.

One configuration of the device 16 includes the connector 64 for interfacing with the air spring bracket 58. In step 112, if the device 16 includes the interface connector 64, then the air spring bracket 58 may be attached to the connector 64. This attaches the air spring 28 to the vehicle frame 12 via a connection of the bracket 58 and the connector 64.

In step 114, by attaching the device 16 at a predetermined longitudinal position on the vehicle frame 12, the axle 26 of the suspension 14, 18, 20 is positioned in the desired longitudinal position. The desired longitudinal position is relative to the vehicle frame 12, when the suspension hanger bracket 22 is attached to the device 16. In step 116, the suspension 14, 18, 20 is attached to the vehicle frame 12 once the suspension hanger bracket 22 is attached to the device 16.

It will now be fully appreciated that the above disclosure provides several advancements to the art of attaching a suspension to a vehicle. In examples described above, any of the suspensions 14, 18, 20 can be conveniently attached to the vehicle frame 12 by securing the hanger bracket 22 of the corresponding suspension to the alignment device 16 using various configurations of connector sets 130, 132.

The above disclosure provides to the art a method for securing a suspension 14, 18, 20. The method may include attaching a frame interface device 16 to a vehicle frame 12 and aligning a first connector set 130. The first connector set 130 may include two first connectors 40 on a hanger bracket 22 of the suspension 14, 18, 20 and a second connector 42 on the frame interface device 16. The two first connectors 40 may straddle the second connector 42. Aligned connectors 40, 42 of the first connector set 130 may be secured together by a fastener 50, 84, 90, 92, 94, 100 thereby securing the suspension 14, 18, 20 to the frame 12.

The method may include pivoting an arm 24 of the suspension 14, 18, 20 about a pivot 30 of the hanger bracket 22.

The fastener 50, 84, 90, 92, 94, 100 may include at least one of a threaded fastener 84, 90, 92, a pin 100, a rod 94, and a bolt 50.

The method may include aligning and securing one of the first connector sets 130, and then aligning and securing another of the first connector sets 130.

The method may also include inserting a tapered spacer 56 into a loosely aligned tapered passageway 134 extending through the aligned first connector set 130.

The method may include inserting the fastener 50, 90, 92, 94, 100 through a longitudinal passageway 136 in the tapered spacer 56, and then securing the aligned first connector set 130 with the fastener 50, 90, 92, 94, 100, thereby precisely aligning the connectors 40, 42 of the first connector set 130.

The method may include inserting a threaded fastener 90, 92 through each first connector 40 and threadably attaching each fastener 90, 92 into threaded openings 140 in opposite ends of the second connector 42, thereby securing the aligned connectors 40, 42 of the first connector set 130.

The method may include inserting a pin 100 through an aligned passageway 138 in the aligned connectors 40, 42 of the first connector set 130 and installing a retainer 88 through an end of the pin 100 to prevent pin extraction, thereby securing the connectors 40, 42 of the first connector set 130.

The method may include inserting a threaded fastener 50, 94, 100 through an aligned passageway 138 in the aligned connectors 40, 42 of the first connector set 130 and installing a threaded nut 52 on an end of the threaded fastener 50, 94, 100 to prevent fastener extraction, thereby securing the aligned connectors 40, 42 of the first connector set 130.

The method may include aligning a second connector set 132, that may include a third connector 82 on the hanger bracket 22 and a fourth connector 84 on the frame interface device 16, aligning the first connector set 130 and/or securing the first connector set 130 prior to securing the second connector set 132.

The third connector 82 may be a hole in the hanger bracket 22 and the fourth connector 84 may be a threaded stud fixedly attached to the frame interface device 16. The method may also include inserting the threaded stud 84 into the hole 82 in the hanger bracket 22 and then installing a retainer 88 on an end of the stud 84 protruding through the hole 82, thereby securing the aligned connectors 82, 84 of the second connector set 132.

The method may include aligning one alignment indicator 68 on the device 16 with another alignment indicator 66 on the frame 12 prior to attaching the frame interface device 16 to the frame 12 and positioning an axle 26 of the suspension 14, 18, 20 at a desired longitudinal position as a result of aligning the indicators 66, 68.

The above disclosure also provides another method for securing a suspension 14, 18, 20 that may include attaching a frame interface device 16 to a vehicle frame 12 and aligning a first connector set 130. The first connector set 130 may include at least one first connector 40 on a hanger bracket 22 of the suspension 14, 18, 20 and at least two second connectors 42 on the frame interface device 16.

The first connector 40 may be straddled by two second connectors 42. The first connector may include a generally tubular portion 150 and each of the second connectors may also include a generally tubular portion 152. One second connector 42 may be proximate an end 154 of the first connector tubular portion 150 and another second connector 42 may be proximate another end 156 of the first connector tubular portion 150.

Then the aligned connectors 40, 42 may be secured together with a fastener 50, 84, 90, 92, 94, 100, thereby securing the suspension 14, 18, 20 to the frame 12.

The method may include inserting a rod 94 through an aligned passageway 138 of the aligned first and second connectors 40, 42 and installing a retainer 52, 88, 96 on an end of the rod 94 to prevent rod extraction, thereby securing the aligned connectors 40, 42.

The above disclosure also provides another method for securing a suspension 14, 18, 20 that may include attaching a frame interface device 16 to a vehicle frame 12 and aligning a first connector set 130. The first connector set 130 may include two first connectors 40 on a hanger bracket 22 of the suspension 14, 18, 20 and a second connector 42 on the frame interface device 16. Two legs 74 of the second connector 42 may be spaced apart to form a channel 142 and the two first connectors 40 may be inserted in the channel 142 and spaced apart along the channel 142.

A fastener 50, 84, 90, 92, 94, 100 may be inserted through a first aligned passageway 138 formed through one of the two first connectors 40 and both legs 74 of the second connector 42. Then the aligned connectors 40, 42 of the first connector set may be secured together with a fastener 50, 84, 90, 92, 94, 100, thereby securing the suspension 14, 18, 20 to the frame 12.

The aligned connectors 40, 42 may form a second aligned passageway 138 through another one of the two first connectors 40 and both legs 74 of the second connector 42. Another fastener 50, 84, 90, 92, 94, 100 may be inserted through the second passageway 138 and a retainer 52, 88 may be installed on an end of each fastener 50, 84, 90, 92, 94, 100 to prevent fastener extraction, thereby securing the aligned connectors 40, 42.

The above disclosure also provides a suspension attachment system 48 that may include a hanger bracket 22 of a suspension 14, 18, 20, a frame interface device 16 that may attach to a vehicle frame 12, and a first connector set 130. The first connector set 130 may include two first connectors 40 on the hanger bracket 22 and a second connector 42 on the device 16.

The two first connectors 40 may straddle the second connector 42 when the first connector set 130 is aligned. A fastener 50, 84, 90, 92, 94, 100 may secure the aligned connector set 130 together, wherein the suspension 14, 18, is secured to the vehicle frame 12 as a result of the aligned and secured first connector set 130.

The hanger bracket 22 may include a pivot 30 about which an arm 24 of the suspension 14, 18, 20 pivots.

The system 48 may also include an axle 26 of the suspension 14, 18, 20 that may be positioned at a desired longitudinal position as a result of the aligned first connector set 130.

The frame interface device 16 may include an alignment indicator 68 and the frame 12 may include another alignment indicator 66. The alignment of the alignment indicators 66, 68 may position an axle 26 of the suspension 14, 18, 20 at a predetermined position on the frame 12 as a result of the aligned first connector set 130.

It is to be understood that the various examples described above may be utilized in various orientations and in various configurations, without departing from the principles of the present disclosure. The embodiments illustrated in the drawings are depicted and described merely as examples of useful applications of the principles of the disclosure, which are not limited to any specific details of these embodiments.

In the above description of the representative examples of the disclosure, directional terms, such as "left," "right," etc., are used for convenience in referring to the accompanying drawings.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of this disclosure. Accordingly, the foregoing detailed description is to be clearly understood as being given by way of illustration and example only, the spirit and scope of the present invention being limited solely by the appended claims and their equivalents.

What is claimed is:

1. A method for securing a suspension, the method comprising the steps of:
    attaching a frame interface device to a vehicle frame;
    then aligning a first connector set, wherein the first connector set includes at least two first connectors on a hanger bracket of the suspension and at least one second connector on the frame interface device, thereby straddling the second connector with the two first connectors; and
    then securing the aligned connectors of the first connector set together with at least one fastener, thereby securing the suspension to the frame.

2. The method of claim 1, the method further comprising the step of:
    pivoting an arm of the suspension about a pivot of the hanger bracket.

3. The method of claim 1, wherein the fastener comprises at least one of a threaded fastener, a pin, a rod, and a bolt.

4. The method of claim 1, wherein the aligning step further comprises the step of:
    aligning at least two of the first connector sets.

5. The method of claim 4, wherein the aligning step further comprises the steps of:
    aligning one of the first connector sets;
    then securing the one of the first connector sets;
    then aligning another one of the first connector sets; and
    then securing the another one of the first connector sets.

6. The method of claim 1, wherein the securing step further comprises the step of:
    inserting a tapered spacer into a loosely aligned tapered passageway extending through the aligned first connector set.

7. The method of claim 6, wherein the securing step further comprises the steps of:
    inserting the fastener through a longitudinal passageway in the tapered spacer; and
    then securing the aligned first connector set with the fastener, thereby precisely aligning the connectors of the first connector set.

8. The method of claim 1, wherein the fastener is two threaded fasteners and the securing step further comprises the steps of:
    inserting one of the threaded fasteners through each first connector; and
    threadably attaching each threaded fastener into threaded openings in opposite ends of the second connector, thereby securing the aligned connectors of the first connector set.

9. The method of claim 1, wherein the securing step further comprises the step of:
    inserting a pin through an aligned passageway in the aligned connectors of the first connector set.

10. The method of claim 9, wherein the securing step further comprises the step of:
    installing a retainer on an end of the pin to prevent pin extraction, thereby securing the aligned connectors of the first connector set.

11. The method of claim 1, wherein the securing step further comprises the step of:
    inserting a threaded fastener through an aligned passageway in the aligned connectors of the first connector set.

12. The method of claim 11, wherein the securing step further comprises the step of:
    installing a threaded nut on an end of the threaded fastener to prevent fastener extraction, thereby securing the aligned connectors of the first connector set.

13. The method of claim 1, wherein the aligning step further comprises the step of:
    aligning a second connector set by aligning a third connector on the hanger bracket with a fourth connector on the frame interface device.

14. The method of claim 13, wherein the aligning step further comprises the step of:
    aligning the first connector set prior to aligning the second connector set.

15. The method of claim 13, wherein the securing step further comprises the step of:
    securing the first connector set prior to securing the second connector set.

16. The method of claim 15, wherein the third connector is a hole in the hanger bracket and the fourth connector is a threaded stud fixedly attached to the frame interface device.

17. The method of claim 16, wherein aligning the second connector set further comprises the steps of:
    inserting the threaded stud into the hole in the hanger bracket; and
    then installing a retainer on an end of the stud protruding through the hole, thereby securing the aligned connectors of the second connector set.

18. The method of claim 1, the method further comprising the step of:
    aligning a first alignment indicator on the device with a second alignment indicator on the frame prior to attaching the frame interface device to the frame.

19. The method of claim 18, wherein an axle of the suspension is positioned at a desired longitudinal position as a result of the aligning step.

20. The method of claim 18, wherein the second alignment indicator is at a desired longitudinal position of an axle.

21. A suspension attachment system, the system comprising:
    a hanger bracket of a suspension;
    a frame interface device which is configured to be connected between the hanger bracket and a vehicle frame; and
    a first connector set which includes at least two first connectors on the hanger bracket and at least one second connector on the device, wherein the two first connectors straddle the second connector when the first connector set is aligned.

22. The system of claim 21, wherein at least one fastener secures the aligned connector set together, and wherein the suspension is secured to the vehicle frame as a result of the aligned and secured first connector set.

23. The system of claim 21, wherein the hanger bracket includes a pivot about which an arm of the suspension pivots.

24. The system of claim 21, wherein an axle of the suspension is positioned at a desired longitudinal position as a result of the aligned first connector set.

25. The system of claim 21, wherein the frame interface device includes a first alignment indicator and the frame includes a second alignment indicator, and wherein alignment of the first and second alignment indicators positions an axle of the suspension at a predetermined position on the frame as a result of the aligned first connector set.

* * * * *